(12) United States Patent
Shigeta (10) Patent No.: US 9,703,442 B2
(45) Date of Patent: Jul. 11, 2017

(54) POSITION DETECTION DEVICE (71) Applicant: Sakai Display Products Corporation, Sakai-shi, Osaka (JP)

(72) Inventor: Mitsuhiro Shigeta, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/312,563

(22) PCT Filed: Sep. 17, 2014

(86) PCT No.: PCT/JP2014/074558
§ 371 (c)(1),
(2) Date: Nov. 18, 2016

(87) PCT Pub. No.: WO2016/042620
PCT Pub. Date: Mar. 24, 2016

(65) Prior Publication Data
US 2017/0115776 A1   Apr. 27, 2017

(51) Int. Cl.
*G06F 3/044*   (2006.01)
(52) U.S. Cl.
CPC .................................. *G06F 3/044* (2013.01)
(58) Field of Classification Search
None
See application file for complete search history.

(56) References Cited

U.S. PATENT DOCUMENTS

2014/0078101 A1   3/2014   Katsurahira

FOREIGN PATENT DOCUMENTS

| JP | 2006-268085 A | 10/2006 |
|----|---------------|---------|
| JP | 4998919 B2 | 8/2012 |
| JP | 3185747 U | 9/2013 |
| JP | 2014-63249 A | 4/2014 |
| WO | WO2014080924 A1 | 5/2014 |

*Primary Examiner* — Nicholas Lee
(74) *Attorney, Agent, or Firm* — Bret E. Field; Bozicevic, Field & Francis LLP (57) ABSTRACT

A position detection device capable of sensing with high resolution and high precision is provided.

In a position detection device comprising: a signal electrode layer in which a plurality of elongated signal electrodes each having a total length longer than the width are arranged in a direction intersecting the longitudinal direction at a predetermined interval; a detection electrode layer in which a plurality of elongated detection electrodes each having a total length longer than the width are arranged in a direction intersecting the longitudinal direction at a predetermined interval so as to intersect the signal electrodes respectively; an insulating layer arranged between the signal electrode layer and the detection electrode layer; a position input panel layered over the signal electrode layer or the detection electrode layer; and a detection part detecting a change in capacitance between the signal electrode and the detection electrode, the position detection device detects an indicated position on the position input panel indicated by an indicator based on a change in the capacitance detected by the detection part, and each of the signal electrode layer and the detection electrode layer is formed by layering two element electrode layers.

5 Claims, 7 Drawing Sheets

POSITION DETECTION DEVICE

CROSS-REFERENCE TO RELATED APPLICATIONS

This application is the national phase under 35 U.S.C. §371 of PCT International Application No. PCT/JP2014/074558 which has an International filing date of Sep. 17, 2014 and designated the United States of America.

FIELD

The present invention relates to a transparent position detection device arranged at a front face of a display apparatus to detect a position touched by a finger.

BACKGOUND

In recent years, a touch panel is often used as an input device for information and communication equipment. A touch panel is arranged at the front face of a display apparatus included in information and communication equipment and a position touched by the user is detected. According to the association between the content displayed on the display apparatus and the position touched by the user's finger, the information communication equipment may be operated.

The position detection system of a touch panel includes a resistive film type, a capacitive type, a retroreflective type, an ultrasonic type, an electromagnetic induction type and so forth. The capacitive type is further categorized into a surface capacitive type and a projected capacitive type. Since the projected capacitive type provides very light touch feeling and multiple touch functions, it has been particularly prevalent in recent years.

In the projected capacitive type, multiple capacitive sensors are formed across the entire touch panel to detect a touched position. This increases the size of the touch panel, causing problems as follows. As the time constant obtained by multiplying the wiring resistance of the capacitive sensor by electric capacitance is increased, the applied voltage waveform is made blunt. If the applied voltage waveform is made blunt, the charge (=voltage×change in capacitance) induced by the capacitive sensor is decreased, resulting in poor separation of noise from signals. In order to improve this, it is necessary to reduce the resistance of the metal wiring constituting the capacitive sensor, which significantly increases the film thickness of the metal wiring to be used. Such an ultra thick film of metal wiring causes problems of, for example, bending of a substrate in production, elongated time of procedure and lowering in working precision.

To address such problems, it has been proposed to use signals with phases shifted from each other by 180 degrees as driving signals for a touch panel (Japanese Patent Application Laid-Open Publication No. 2014-63249).

SUMMARY

In the conventional technique, however, four intersection points for capacitive coupling are needed, making it difficult to perform sensing with high resolution and high precision.

The present disclosure has been made in view of the circumstances as described above, and aims to provide a position detection device capable of sensing with high resolution and high precision.

In a position detection device according to an aspect of the present disclosure comprising: a signal electrode layer in which a plurality of elongated signal electrodes each having a total length longer than the width are arranged in a direction intersecting the longitudinal direction at a predetermined interval; a detection electrode layer in which a plurality of elongated detection electrodes each having a total length longer than the width are arranged in a direction intersecting the longitudinal direction at a predetermined interval so as to intersect each of the signal electrodes; an insulating layer arranged between the signal electrode layer and the detection electrode layer; a position input panel layered over the signal electrode layer or the detection electrode layer; and a detection part detecting a change in capacitance between the signal electrode and the detection electrode, the position detection device detects an indicated position on the position input panel indicated by an indicator based on the change in the capacitance detected by the detection part, each of the signal electrode layer and the detection electrode layer is formed by layering two element electrode layers.

According to an aspect of the present disclosure, the electrode layer includes two layers, which allows for detection of a position with high resolution and high precision.

The above and further objects and features will more fully be apparent from the following detailed description with accompanying drawings.

DETAILED DESCRIPTION

The present disclosure will specifically be described below with reference to the drawings illustrating the embodiments thereof.

Embodiment 1

Figure 1:
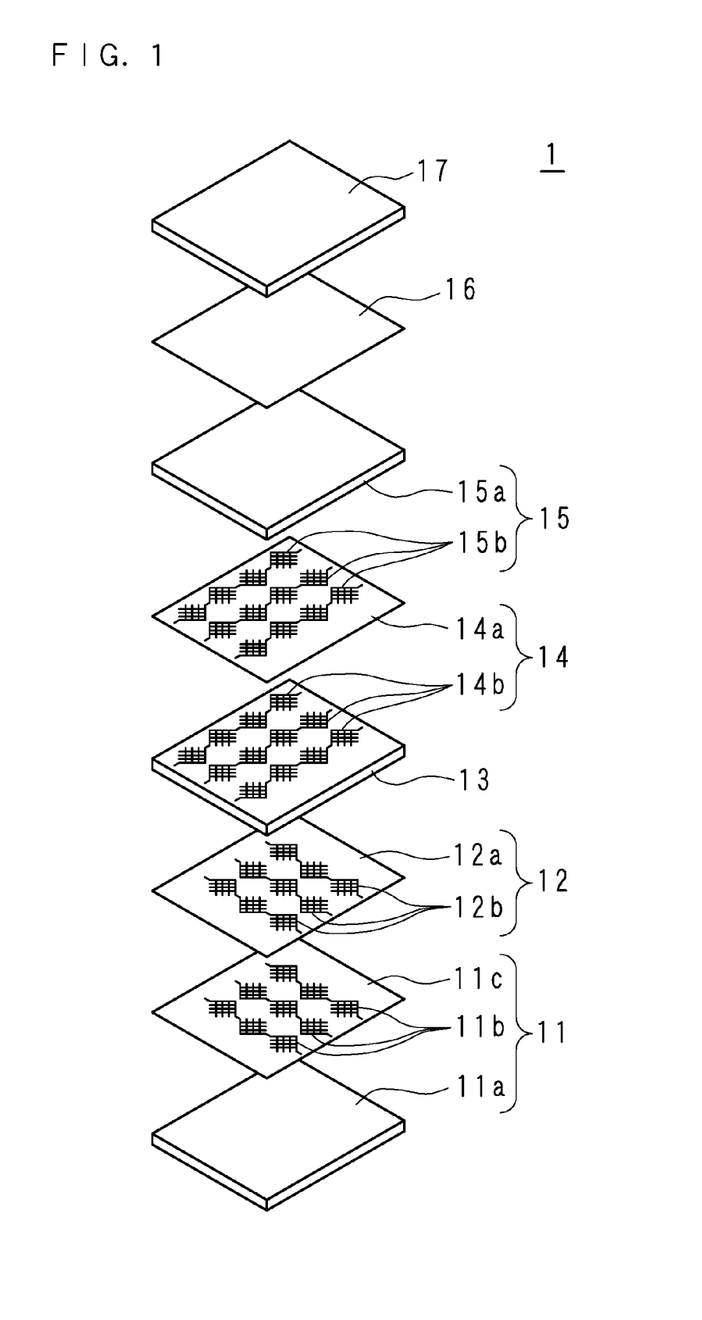
FIG. 1 is an exploded perspective view schematically illustrating the structure of a main part of a touch panel.

FIG. 1 is an exploded perspective view schematically illustrating the structure of a main part of a touch panel 1. The touch panel 1 includes a first X electrode layer 11, a second X electrode layer 12, an insulating layer 13, a first Y electrode layer 14 and a second Y electrode layer 15. Each of the first X electrode layer 11, the second X electrode layer 12, the insulating layer 13, the first Y electrode layer 14 and the second Y electrode layer 15 has the shape of a rectangular plate. The longitudinal and lateral dimensions thereof are substantially the same. The longitudinal and lateral dimensions are determined depending on the display apparatus to which the touch panel 1 is attached.

Figure 2:
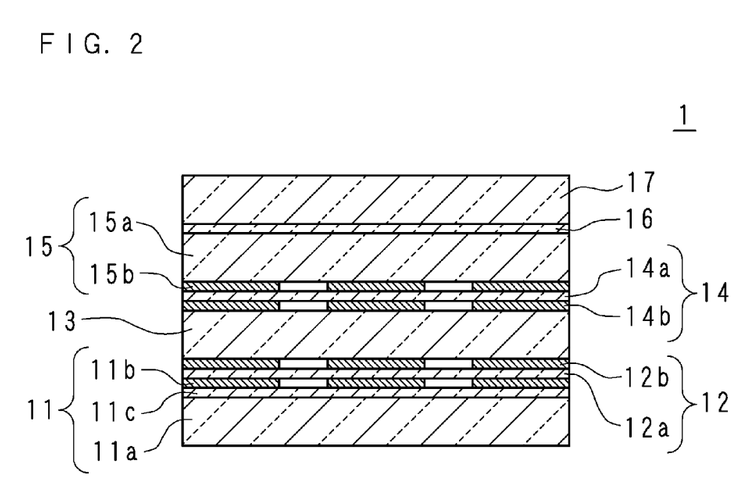
FIG. 2 illustrates a hierarchical structure of a touch panel.

FIG. 2 illustrates a hierarchical structure of the touch panel 1. In addition to the first X electrode layer 11 (element electrode layer), the second X electrode layer 12 (element electrode layer), the insulating layer 13, the first Y electrode layer 14 (element electrode layer) and the second Y electrode layer 15 (element electrode layer), the touch panel 1 further includes a transparent film 16 and a cover glass 17. In the touch panel 1, the second X electrode layer 12 is layered over the first X electrode layer 11, and the insulating layer 13, the first Y electrode layer 14 and the second Y electrode layer 15 are further layered over the second X electrode layer 12 in this order. Furthermore, the transparent film 16 and the cover glass 17 (position input panel) are layered over the second Y electrode layer 15 and are fixed thereto.

The first X electrode layer 11 includes a base 11a, first layer X electrodes 11b and a transparent film 11c. The base 11a is made of an insulator with high light transparency such as, for example, Polyethylene Terephthalate (PET) resin. Each of the first layer X electrodes 11b is made of a transparent conductive material such as, for example, Indium Tin Oxide (ITO) or Indium Zinc Oxide (IZO). The transparent film 11c is a film with high light transparency such as an Optical Clear Adhesive (OCA) film. The first layer X electrodes 11b are formed on the surface of the transparent film 11c. The transparent film 11c on which the first layer X electrodes 11b are formed is bonded to the base 11a.

The second X electrode layer 12 includes an intermediate insulating layer 12a and second layer X electrodes 12b. The intermediate insulating layer 12a is a dielectric or insulating film with high light transparency. The shape of each of the second layer X electrodes 12b is similar to that of the first layer X electrode 11b. The second layer X electrodes 12b are formed on the intermediate insulating layer 12a. In the description below, a simple description of "X electrode(s)" refers to either one or both of the first layer X electrode(s) 11b and the second layer X electrode(s) 12b.

The insulating layer 13 is a dielectric or insulating thin film with high light transparency.

The first Y electrode layer 14 includes an intermediate insulating layer 14a and first layer Y electrodes 14b. Each of the first layer Y electrodes 14b is made of a transparent conductive material such as, for example, ITO or IZO. The first layer Y electrodes 14b are layered on the insulating layer 13. The intermediate insulating layer 14a is layered over the first layer Y electrodes 14b.

The second Y electrode layer 15 includes a base 15a and second layer Y electrodes 15b. The base 15a is made of an insulator with high light transparency such as, for example, PET resin. The second layer Y electrodes 15b are layered on the intermediate insulating layer 14a. The base 15a is fixed to the second layer Y electrodes 15b with an adhesive. An adhesive which is principally made of, for example, acrylic or silicone and which maintains high light transparency even after bonding is employed. In the description below, a simple description of "Y electrode(s)" refers to either one or both of the first layer Y electrode(s) 14b and the second layer Y electrode(s) 15b. Moreover, as the material for the X electrode and the Y electrode, metal material not hindering the translucency may also be used other than the transparent electrode described above.

The transparent film 16 or scattering film and the cover glass 17 are further layered over the second Y electrode layer 15.

Figure 3:
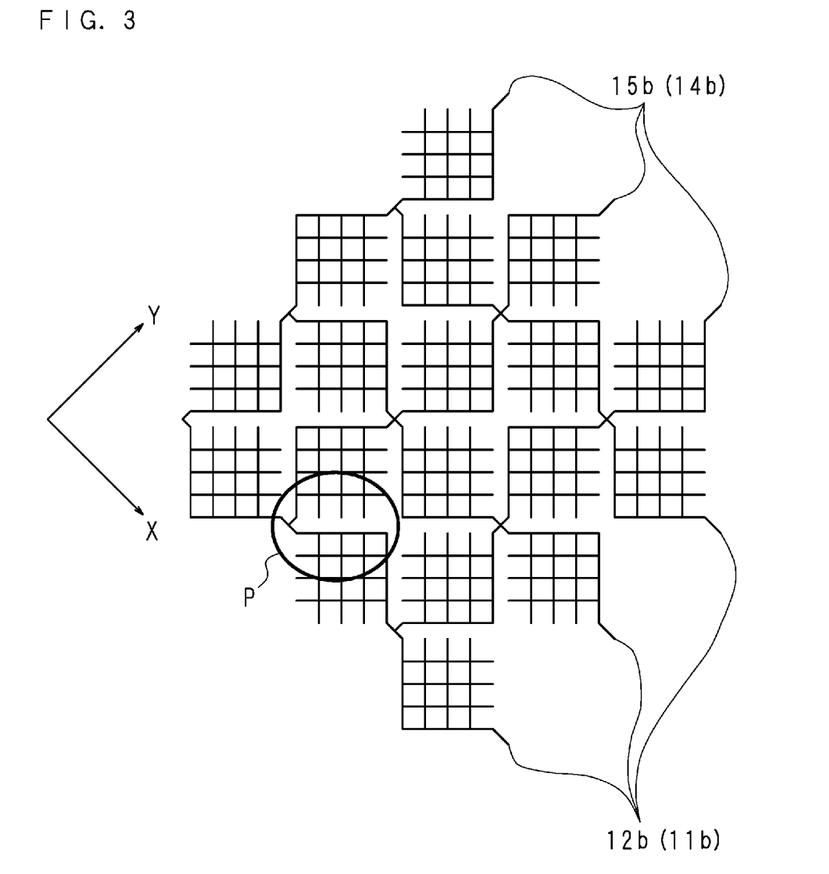
FIG. 3 illustrates patterns of X electrodes and Y electrodes.

FIG. 3 illustrates patterns of the X electrodes and Y electrodes. FIG. 3 illustrates a plan view of the main part of the touch panel 1. As illustrated in FIG. 1 and FIG. 3, each of the first layer X electrodes 11b constituting the X electrodes is a so-called mesh electrode. The first layer X electrodes 11b include a plurality of matrix electrodes in which multiple (four in FIG. 3) vertical electrodes that are in parallel with each other and multiple (four in FIG. 3) lateral electrodes that are in parallel with each other and that cross the vertical electrodes are arranged in matrix. The first layer X electrodes 11b include lines of matrix electrodes, each line having matrix electrodes that are arranged at equal intervals along a predetermined direction such that corner portions of the matrices are adjacent to each other and the adjacent corner portions are connected to each other. The lines are arranged at equal intervals in a direction intersecting the arrangement direction of the matrix electrodes and are collectively referred to as the first layer X electrodes 11b. The second layer X electrodes 12b constituting the X electrodes have substantially the same pattern as that of the first layer X electrodes 11b. The first layer X electrodes 11b and the second layer X electrodes 12b are aligned and layered such that one is placed over the other in plan view. It is noted that the arrangement direction of the matrix electrodes in the first layer X electrodes 11b and the second layer X electrodes 12b is called an X direction. While four vertical electrodes and lateral electrodes are illustrated in FIG. 3, the number of electrodes is not limited thereto.

The Y electrodes have a configuration similar to the X electrodes. That is, the first layer Y electrodes 14b and the second layer Y electrodes 15b have substantially the same patterns, and are aligned and layered such that one is placed over the other in plan view. The arrangement direction of the matrix electrodes constituted by the Y electrodes is the direction intersecting the X direction. This direction is referred to as a Y direction. Moreover, the direction in which the lines are arranged side by side is the X direction. As illustrated in FIG. 3, the matrix electrodes constituting the X electrodes and the matrix electrodes constituting the Y electrodes are so arranged not to overlap in plan view, while the X electrodes and the Y electrodes are arranged in a checkerboard pattern.

Figure 4:
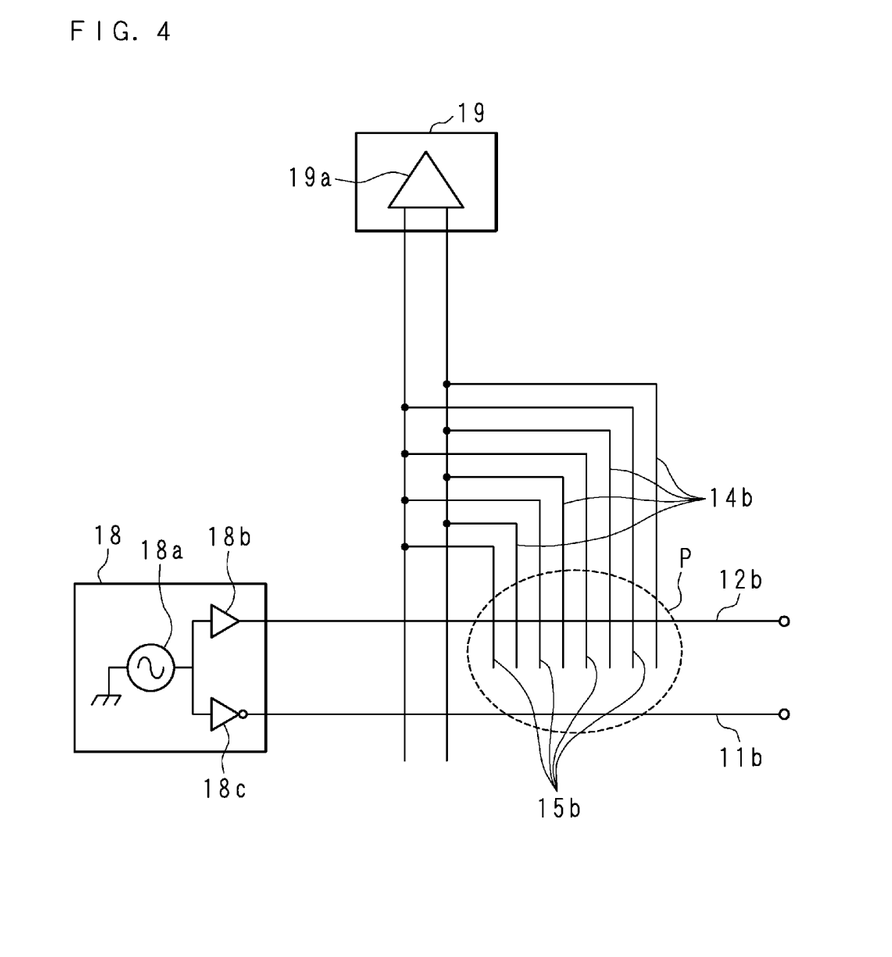
FIG. 4 is a circuit diagram illustrating the principle of position detection in a touch panel.

Next, the principle of the position detection by the touch panel 1 according to Embodiment 1 will be described. FIG. 4 is a circuit diagram illustrating the principle of position detection in the touch panel 1. FIG. 4 illustrates the case where a user's finger touches the portion indicated by P in FIG. 3. As illustrated in FIG. 4, a signal circuit 18 is connected to the X electrodes. Moreover, a current detection circuit 19 is connected to the Y electrodes. FIG. 4 illustrates the case where signals are applied to the X electrodes and observed at the Y electrodes. As in the conventional touch panel, signals are applied in sequence to the multiple lines of X electrodes and the output signals from the lines of the Y electrodes are observed in sequence, to detect a position. That is, if signals are applied to the X electrodes in a line corresponding to the detected position, output signals are observed at the Y electrodes in a line corresponding to the detected position. In the conventional technique, signals are applied to two adjacent lines of X electrodes, and signals from the two adjacent lines of Y electrodes are observed.

In the touch panel 1 according to Embodiment 1, signals are applied to the first layer and the second layer in a line of X electrodes. As illustrated in FIG. 4, the signal circuit 18 includes a signal generator 18a, a buffer 18b and an inverter 18c. The signal generator 18a generates a driving signal. The driving signal generated by the signal generator 18a is applied to the first layer X electrodes 11b through the inverter 18c. Likewise, the driving signal is transferred to the second layer X electrodes 12b through the buffer 18b. Since the driving signals are applied to the first layer X electrodes 11b and the second layer X electrodes 12b through the inverter 18c and the buffer 18b, respectively, the signals with phases different from each other by 180 degrees are applied thereto.

That is, the first layer X electrodes 11b and the second layer X electrodes 12b configure balanced wiring. At the Y electrodes, output signals of the first layer and the second layer in one line are observed. The observation of output signals is performed by the current detection circuit 19 (detection part) as in the conventional technique. For example, the current detection circuit 19 includes a differential amplifier 19*a* as illustrated in FIG. 4. The differential amplifier 19*a* inputs the outputs of the first layer and the second layer of the Y electrodes. If the output value of the differential amplifier 19*a* exceeds a predetermined threshold, it is determined that the user touches the touch panel.

As illustrated in FIG. 3, each of the electrodes has a mesh structure in Embodiment 1. The number of connection points where the X electrodes and Y electrodes are connected by the user touching the touch panel 1 is sixteen. In other words, as the mesh electrodes has four electrodes while the Y electrodes and the X electrodes have two-layered structures, 4×2×2=16, i.e., the number of connection points is 16.

The touch panel 1 according to Embodiment 1 produces the following effects. Since the X electrodes and the Y electrodes are respectively formed in two layers to achieve a balanced wiring structure, signals with less bluntness due to noise in the voltage waveforms may be transmittable. Thus, since the voltage waveform is less blunt, lowering in the voltage is reduced, making it possible to enhance the efficiency of capacitive coupling between the X electrodes and Y electrodes. Moreover, the time constant for each electrode is made small, which allows the film thickness of the electrode to be thin. Furthermore, the increased efficiency in capacitive coupling can increase the sensibility of the touch panel. In addition, the balanced wiring doubles the number of the X electrodes and the Y electrodes, and quadruples the capacitive coupling parts occurring between the X electrodes and the Y electrodes generated when the user touches the touch panel compared to the conventional touch panel. This can further increase the sensibility. While the X electrodes are assumed to be the electrodes to which signals are applied and the Y electrodes are assumed to be the electrodes at which signals are observed, the present embodiment is not limited thereto. The electrodes to which signals are applied may also be the Y electrodes whereas the electrodes at which signals are observed may also be the X electrodes. Furthermore, though an electrode has a mesh structure in the description, it is not limited thereto. The electrode may also be a comb-shaped electrode.

Variation

Figure 5:
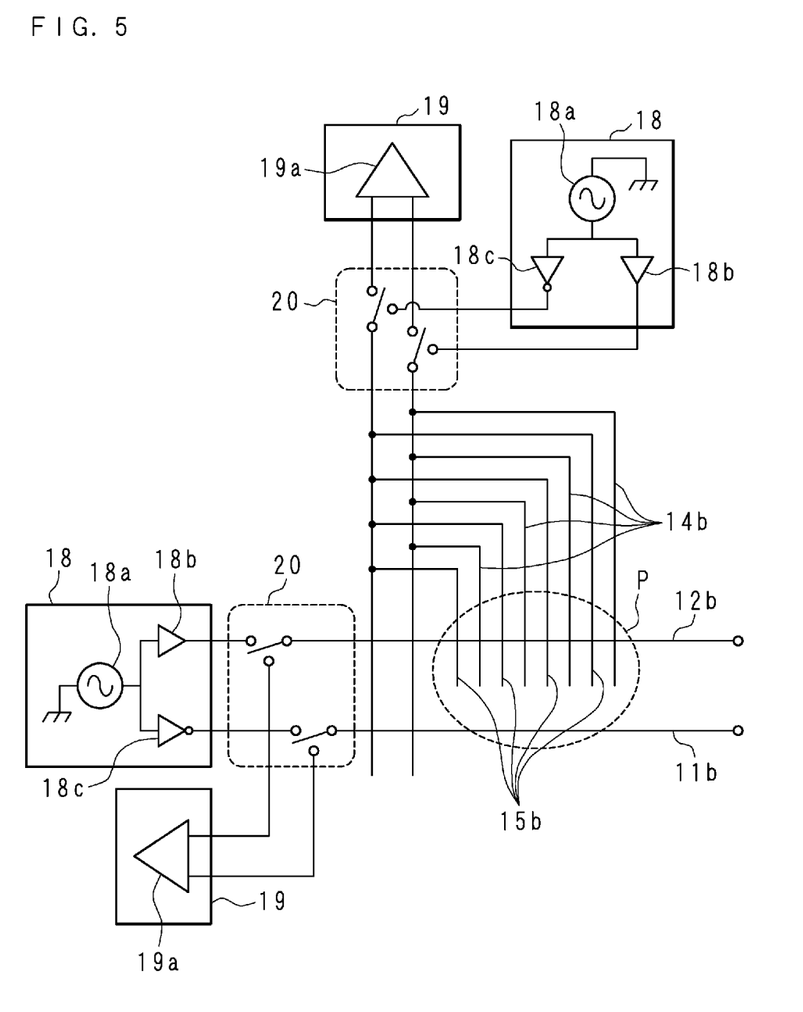
FIG. 5 illustrates the operating principle of a touch panel.

FIG. 5 illustrates the operating principle of the touch panel 1. In the description below, an electrode to which a signal is applied is called a signal electrode, whereas an electrode at which an output signal is observed is called a detection electrode. While the X electrode is a signal electrode and the Y electrode is a detection electrode in Embodiment 1, the operation in which the Y electrode is the signal electrode and the X electrode is the detection electrode is also performed in Variation. As illustrated in FIG. 5, a switching circuit 20 is provided in Variation. The configuration other than the switching circuit 20 is similar to that in Embodiment 1, and thus will not be described here.

In Variation, the switching circuit 20 allows the operation in which the X electrode is the signal electrode and the Y electrode is the detection electrode to be switched to the operation in which the Y electrode is the signal electrode and the X electrode is the detection electrode. The operation may be switched as described below, for example. Of the signal electrodes, those in the line to which signals are applied are fixed, and output signals are detected in sequence for all the lines of the detection electrodes. Similar operation is performed in sequence for all the lines by changing the lines to which signals are applied. Subsequently, the signal electrodes and the detection electrodes are switched from each other, and similar operation is performed. Upon terminating, the signal electrodes and the detection electrodes are switched again, and similar operation is repeated. In any case, the principle of the operation for detecting a position is similar to Embodiment 1, which thus will not be described here.

The touch panel 1 according to Variation produces the following effects in addition to those in Embodiment 1. By switching the signal electrodes and the detection electrodes with time, a position in the XY direction and a time-dependent change in the position may also be detected.

Embodiment 2

Figure 6:
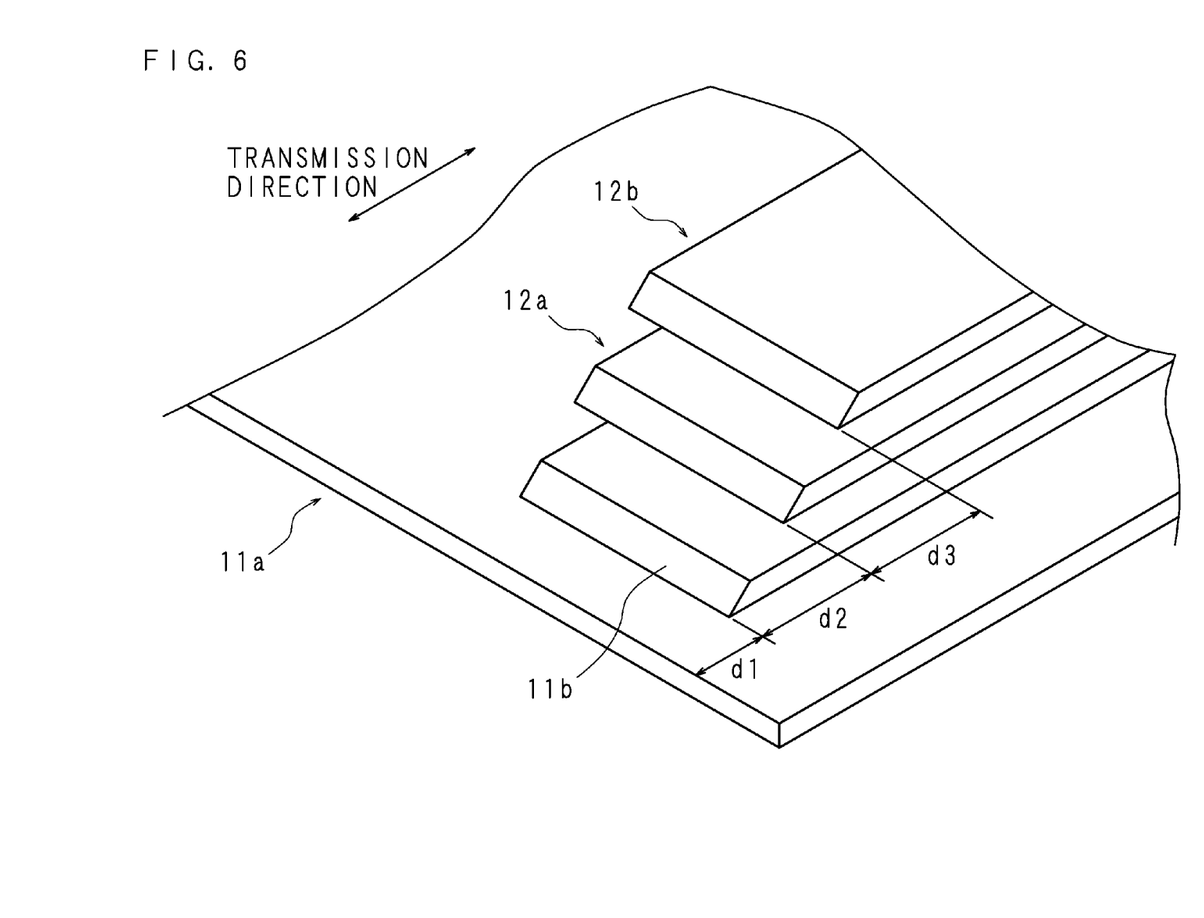
FIG. 6 schematically illustrates the structure of an end of an electrode.

Embodiment 2 is characterized by an end of an electrode. In Embodiment 2, ends of X electrodes and Y electrodes are formed to have a stepped structure. FIG. 6 schematically illustrates the structure of an end of an electrode. FIG. 6 illustrates an example of an X electrode. FIG. 6 illustrates ends of the base 11*a*, the first layer X electrode 11*b*, the intermediate insulating layer 12*a* and the second layer X electrode 12*b*. The ends of the first layer X electrode 11*b*, intermediate insulating layer 12*a* and the second layer X electrode 12*b* are formed to have a stepped structure along the signal transmission direction. In FIG. 6, the base 11*a* is the longest in the transmission direction, and the length becomes shorter in the order of the first layer X electrode 11*b*, the intermediate insulating layer 12*a* and the second layer X electrode 12*b* which is the shortest.

The end of the first layer X electrode 11*b* is positioned away from the end of the base 11*a* by a distance d1. The end of the intermediate insulating layer 12*a* is positioned away from the end of the first layer X electrode 11*b* by a distance d2. The end of the second layer X electrode l2*b* is positioned away from the end of the intermediate insulating layer 12*a* by a distance d3.

The touch panel 1 according to Embodiment 2 produces the following effects in addition to those produced by the touch panel 1 according to Embodiment 1. The stepped structure can reduce the area for extracting the electrode and the routing of the electrode compared to the structure with aligned ends.

Embodiment 3

Embodiment 3 is characterized by the structure of an electrode. In Embodiment 1 or 2, the first layer X electrodes 11*b* and the second layer X electrodes 12*b* constituting the X electrodes as well as the first layer Y electrodes 14*b* and the second layer Y electrodes 15*b* constituting the Y electrodes have a structure in which a plurality of materials are layered. Other configuration parts are similar to those described in Embodiment 1 or 2 and thus will not be described here.

Figure 7:
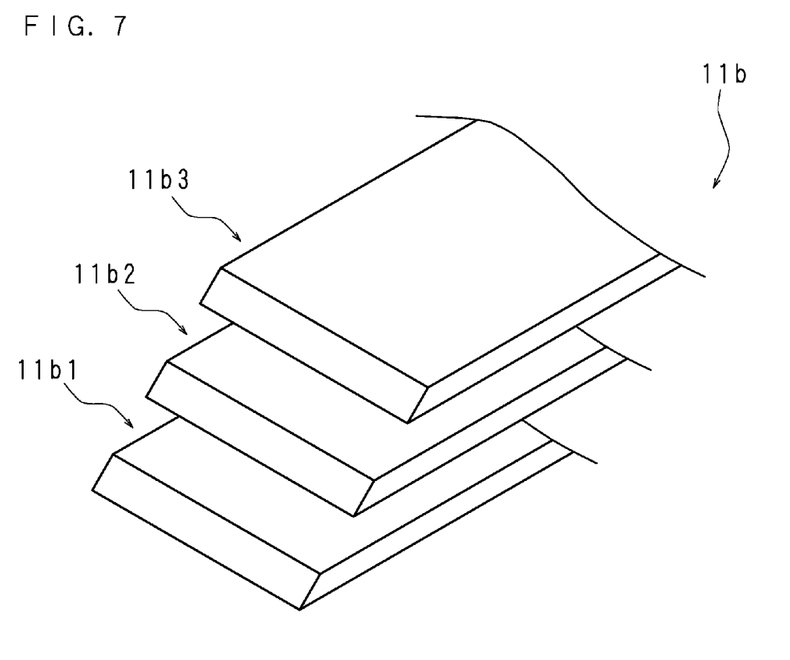
FIG. 7 illustrates a layered structure of an electrode.

FIG. 7 illustrates a layered structure of an electrode. FIG. 7 illustrates an example of the structure of the first layer X electrode 11*b*. In the first layer X electrode 11*b*, three materials of a first material 11*b*1, a second material 11*b*2 and a third material 11*b*3 each formed in a plate-like shape are layered. The first material 11*b*1 is titanium (Ti), the second material 11*b*2 is aluminum (Al) and the third material 11*b*3 is tantalum (Ta). The material for use other than the ones described above includes nickel (Ni), copper (Cu) and so forth. If the electrode is made of two materials, tantalum and aluminum are layered, for example. Among the materials described above, titanium and tantalum have low light reflectivity and high adherence to a substrate or an insulating layer, which is a characteristic highly suitable for a material to be used for the electrode.

The present embodiment produces the following effects in addition to those produced in Embodiment 1 or 2. As the first layer X electrode 11b or the like has a layered structure of different materials not hindering translucency, it is possible to constitute an electrode which has low resistance and does not hinder translucency.

The technical features (components) described in each example embodiment may be combined with one another, and such combinations may form new technical features.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.H

The invention claimed is:

1. A position detection device, comprising:
    a signal electrode layer in which a plurality of elongated signal electrodes each having a total length longer than a width are arranged in a direction intersecting a longitudinal direction at a predetermined interval;
    a detection electrode layer in which a plurality of elongated detection electrodes each having a total length longer than a width are arranged in a direction intersecting a longitudinal direction at a predetermined interval so as to intersect the signal electrodes respectively;
    an insulating layer arranged between the signal electrode layer and the detection electrode layer;
    a position input panel layered over the signal electrode layer or the detection electrode layer; and
    a detection part detecting a change in capacitance between the signal electrodes and the detection electrodes,
    wherein
        the position detection device detects an indicated position on the position input panel by an indicator based on a change in the capacitance detected by the detection part, and
        each of the signal electrode layer and the detection electrode layer is formed by layering two element electrode layers.

2. The position detection device according to claim 1, wherein
    the detection part includes
    a signal circuit applying signals to the signal electrodes, and
    a detection circuit detecting signals output to the detection electrodes, and
    the signal circuit applies signals with different phases to signal electrodes in each of the two element electrode layers constituting the signal electrode layer.

3. The position detection device according to claim 1, wherein
    the two element electrode layers constituting the signal electrode layer both include a plurality of signal electrodes having substantially a same shape,
    the two element electrode layers constituting the signal electrode layer are layered with an insulating layer interposed between the element electrode layers,
    the two element electrode layers constituting the detection electrode layer both include a plurality of detection electrodes having substantially a same shape, and
    the two element electrode layers constituting the detection electrode layer are layered with an insulating layer interposed between the element electrode layers.

4. The position detection device according to claim 1, wherein
    each of the element electrode layers constituting the signal electrode layer or the detection electrode layer has a step at one end in a longitudinal direction of a signal electrode or a detection electrode constituting the element electrode layer.

5. The position detection device according to claim 1, wherein
    each of the plurality of signal electrodes and detection electrodes is formed by layering a plurality of different materials.

* * * * *